US007322886B2

(12) United States Patent
Manz

(10) Patent No.: US 7,322,886 B2
(45) Date of Patent: Jan. 29, 2008

(54) GAMING MACHINE WITH SECONDARY EVENT DISPLAYING MAIN GAME WIN

(75) Inventor: Robert Manz, Las Vegas, NV (US)

(73) Assignee: Rocket Gaming Systems, LLC, Grove, OK (US)

( * ) Notice: Subject to any disclaimer, the term of this patent is extended or adjusted under 35 U.S.C. 154(b) by 487 days.

(21) Appl. No.: 10/924,756

(22) Filed: Aug. 23, 2004

(65) Prior Publication Data

US 2006/0040729 A1 Feb. 23, 2006

(51) Int. Cl.
*A63F 13/00* (2006.01)

(52) U.S. Cl. .......... 463/20

(58) Field of Classification Search .......... 463/13, 463/16–20
See application file for complete search history.

(56) References Cited

U.S. PATENT DOCUMENTS 5,393,057 A 2/1995 Marnell, II
5,647,798 A 7/1997 Falciglia
5,935,002 A 8/1999 Falciglia
6,302,790 B1 10/2001 Brossard
6,334,814 B1 1/2002 Adams
6,358,147 B1 3/2002 Jaffe et al.
6,569,017 B2 5/2003 Enzminger et al.
6,592,457 B1 7/2003 Frohm et al.
2003/0186736 A1 10/2003 Benbrahim
2003/0190958 A1 10/2003 Paulsen

FOREIGN PATENT DOCUMENTS

GB 2 072395 A 9/1981

OTHER PUBLICATIONS

"Chapter 1—Slot Machines", http://www.geocities.com/brianzz423/chapter1.html, Nov. 2003, 9 pages.
FatTonys-Slots.com, "Double Diamond Slots", http://www.fat-tonys-slots.com/double_diamond_slots.html, Nov. 2003, 1 page.

*Primary Examiner*—Scott Jones
(74) *Attorney, Agent, or Firm*—Weide & Miller, Ltd.

(57) ABSTRACT

In a method of playing a game, a player plays a main game in which a first set of indicia are displayed. The game may be slots, keno, bingo, pull-tabs, a lottery or the like. If the player receives a special symbol or combination of symbols while playing the main game, the outcome of the game is a guaranteed win. A second set of indicia which represent or correspond to that guaranteed win are displayed to the player, whereby the player is made aware of the particular winning result. If the player does not receive the special symbol or combination of symbols, the play of the main game continues and it is determined if the outcome thereof is a winning result.

12 Claims, 4 Drawing Sheets

| | | | | |
|---|---|---|---|---|
| 2 | 10 | 1 | 18 | 9 |
| 8 | 64 | 40 | 58 | 22 |
| 17 | 3 | 52 | 38 | 68 |
| 26 | 33 | 41 | 31 | 27 |
| 34 | 7 | 54 | 61 | 70 |
*FIG. 4A*
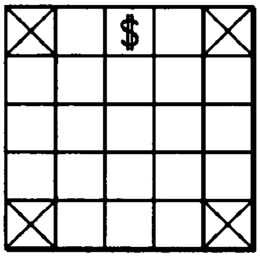
*FIG. 4B*
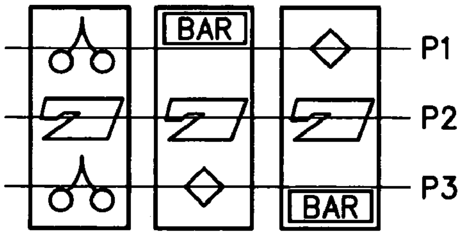
*FIG. 4C*

GAMING MACHINE WITH SECONDARY EVENT DISPLAYING MAIN GAME WIN

FIELD OF THE INVENTION

The present invention relates to a method of playing a game and a gaming machine.

BACKGROUND OF THE INVENTION

Gaming continues to grow in popularity. As such occurs, game players continue to seek new game which have greater levels of excitement.

In the area of commercial or "wagering" gaming, game excitement has been increased by varying the way players may win the game. For example, in older games of slots, a player could only be a winner if a winning set of symbols appeared along one or a few horizontal pay lines. In accordance with newer games, players may now obtain winning combinations of symbols which appear in a variety of combinations or patterns, including in "V" patterns and the like.

In other instances, players are now offered the opportunity for a bonus. Such a bonus may comprise the spin of a secondary wheel offering a prize in addition to the prize awarded to the player while playing the original game.

At the same time, it has been found that players tend to favor games which are not too complex. As a result, it is desired that games offering new and exciting features provide those features in an easy to understand game play format.

A new game and method of playing a game meeting having these qualities is desired.

SUMMARY OF THE INVENTION

The invention is a method of playing a game and gaming machine configured to present such a game.

Preferably, the game is a wagering type game. As such, in the method of play, the player preferably places a wager and the gaming machine is configured to accept a wager.

The play of the game includes the play of a base or main game which includes the display of a first set of indicia. This game may be of a variety of types, such as bingo, keno, video poker or slots, lotteries, and pull-tabs, among others. Depending upon the format of the main game, that game may have one or more steps or parts. For example, in the games of bingo and keno, player numbers are selected in one step, numbers are drawn in another, and matches are determined in yet another. In the game of video poker, a first set of cards may be displayed to the player and the player may then be permitted to discard one or more of those cards in favor of newly dealt cards.

During the play of the main game it is determined if the player has received a special symbol or group of symbols. Such a symbol or set of symbols corresponds to a guaranteed win. The play of the main game generally involves use of a particular set of symbols, such as cards from a deck of cards or numbers used in bingo or keno. The special symbol or symbols may comprise a particular set of those symbols or, more preferably, a symbol or symbols in addition thereto.

If the special symbol or set of symbols are received, then the outcome of the game play is a guaranteed win. The particular win, however, is represented by the display of a second set of indicia.

In one embodiment, the second set of indicia comprises a set of indicia which corresponds to a winning result of the main game. For example, if the main game is the game of slots, the second set of indica preferably comprises a set of indicia comprising one of the predetermined winning combinations of indicia in the play of the slot game.

In another embodiment, the second set of indicia may comprise a set of symbols different from those used to play the main game. For example, the second set of symbols may be displayed as the outcome of a slot-type game when the main game is the game of bingo.

Preferably, the player is awarded winnings, such as a prize, credits or coins, for the outcome of the guaranteed win. If the player does not receive the special symbol or set of symbols, then the main game is played to completion and it is determined if the player has won the main game. If the player wins the main game, the player is preferably awarded winnings.

The game of the invention offers an added level of player excitement in that the player has the opportunity for a guaranteed win independent from the outcome of the game which is being played. In addition, excitement is heightened because even if the player receives the special symbol or set of symbols, the player does not then know what prize has been won. Instead, the player must wait until the second set of symbols is displayed to know the particular winning result of the guaranteed win.

Further objects, features, and advantages of the present invention over the prior art will become apparent from the detailed description of the drawings which follows, when considered with the attached figures.

DESCRIPTION OF THE DRAWINGS

FIG. 1(*b*) illustrates a video-type gaming machine in accordance with the invention;

FIG. 3(*b*) illustrates another first set of indicia displayed as part of the play of a main game of the method of the invention, the first set of indicia including a special symbol associated with a guaranteed win;

FIG. 3(*c*) illustrates a second set of indicia representing the outcome of the guaranteed win;

FIG. 4(*a*) illustrates a first set of indicia displayed as part of the play of another main game of the method of the invention;

FIG. 4(*b*) illustrates further play of the main game as illustrated in FIG. 4(*a*), the play including the display of a special symbol associated with a guaranteed win; and FIG. 4(*c*) illustrates a second set of indicia representing the outcome of the guaranteed win.

DETAILED DESCRIPTION OF THE INVENTION

The invention is a method of playing a game and apparatus for implementing the game. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the invention is a method of playing a game. Preferably, the game is implemented on a gaming machine. In accordance with the invention, a player plays a game. If a particular symbol or arrangement of symbols are received, the outcome of the game is a guaranteed win. The win is represented by a secondary display of symbols, those symbols corresponding to a winning outcome.

Figure 1A:
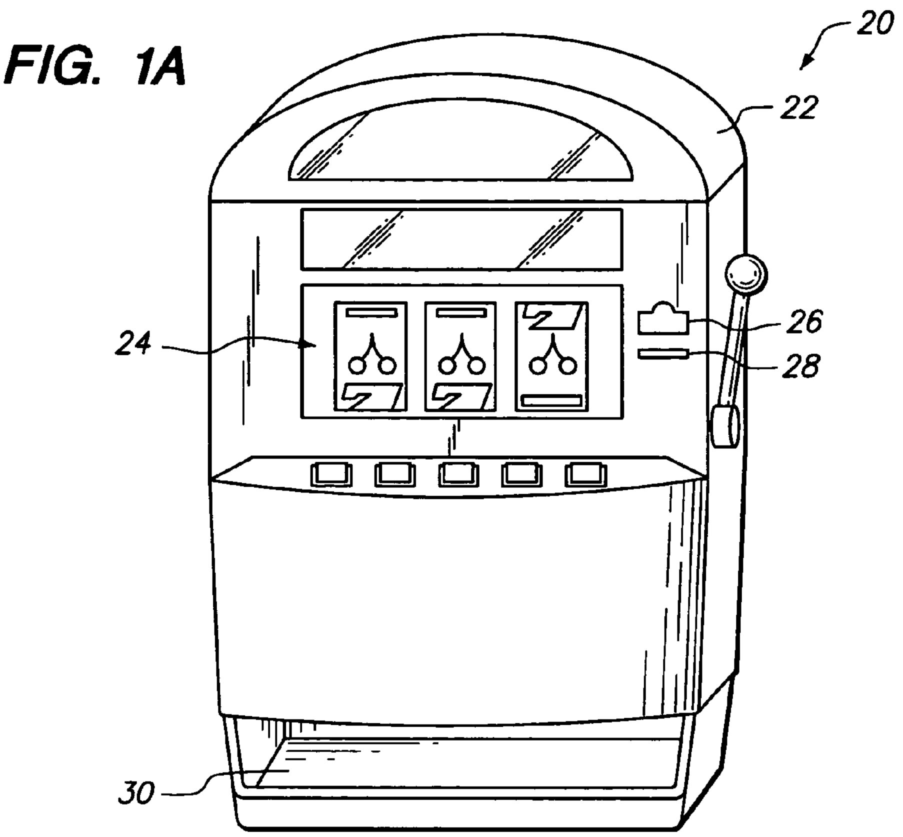
FIG. 1(*a*) illustrates a slot-type gaming machine in accordance with the invention.
Figure 1B:
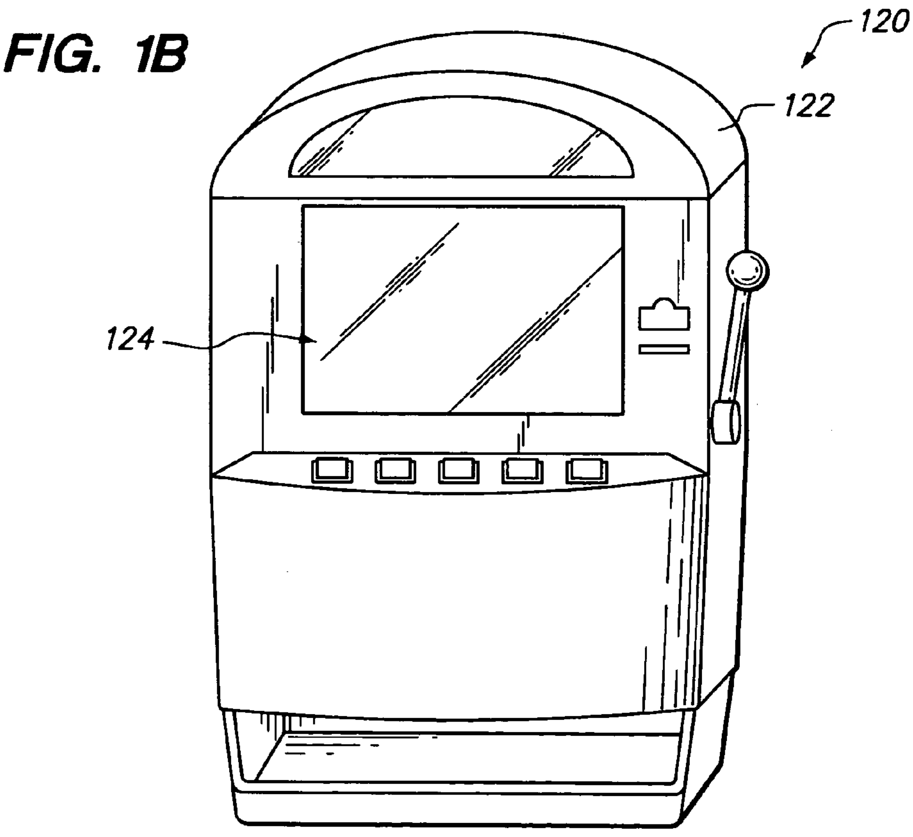

Referring to FIG. 1, there is illustrated a gaming machine 20 in accordance with one embodiment of the present invention. In general, the gaming machine 20 is adapted to present one or more games for play to a player. As illustrated, the gaming machine 20 comprises a housing or cabinet 22 for supporting and/or housing various components of the gaming machine 20. In the embodiment illustrated, the gaming machine 20 is adapted to present a game of slots and includes one or more rotatable reels 24.

Preferably, the gaming machine 20 is configured to present one or more games to a player dependent upon a player placing a wager or bet, and in the event the outcome of the game is one or more predefined winning outcomes, pay the player a winning. As such, the gaming machine 20 includes a mechanism for accepting a wager or a bet. As illustrated, a coin acceptor 26 is provided for accepting coins. The gaming machine 20 also includes a bill acceptor or validator 28 for accepting paper currency. In one or more embodiments, other mechanisms may be provided for accepting a wager, such as a card or ticket/coupon reader.

The gaming machines 20 may include a variety of other components, as are known. For example, the gaming machine 20 may include a plurality of input devices. These input devices may include one or more buttons, such as a "play credit" button and/or a "bet max" button for permitting a player to place wagers from a pool of credits won or paid by the player. The input devices may include a "spin reels" button or a pull-type handle for effecting the spinning of the reels.

In a preferred embodiment, a player is awarded a payout in the event the outcome of the game is a winning outcome. In one or more embodiments, the amount of the award is based on the amount wagered by the player and/or the odds of receiving the particular outcome. The payout may comprise credit, actual monies or other items of value or representative of value, such as a ticket or a physical prize.

When the player is paid in the form of stored credits, the number of credits is indicated to the player. A "cash out" button is preferably provided for permitting a player to be paid the stored credits. In one embodiment, the means for paying a player comprises a coin dispenser (not shown) for dispensing coins to a coin tray 30. A player may also be permitted to be paid their credits or winnings on a player card in electronic form, such as via a card reader/writer, via a ticket or coupon.

Another embodiment gaming machine 120 is illustrated in FIG. 1(*b*). This embodiment gaming machine 120 is a "video"-type gaming machine. Again, the gaming machine 120 includes a housing 122. Preferably, game information is displayed on a display 124. The display 124 may comprise a wide variety of devices such as an LCD, plasma, DLP, LED or CRT display.

It will be appreciated that the term "gaming machine" as used herein may apply to a variety of devices other than the gaming machines illustrated in FIGS. 1(*a*) and 1(*b*). The term gaming machine may apply to a wide variety of devices or systems that are adapted to present a game to a player. For example, the device may comprise an arcade game, or a computing device configured to present a game, such as a player's home computer which is connected to a game server by a communication link. The gaming machine may be of the upright, bar-top or other variety, and may be located in a casino or other location. The term "gaming machine" as used herein may also include a wide variety of other equipment and devices utilized to present games, such as table game equipment used to present card, dice and other games, and tickets and other equipment, such as pull-tabs and lottery tickets.

Figure 2:
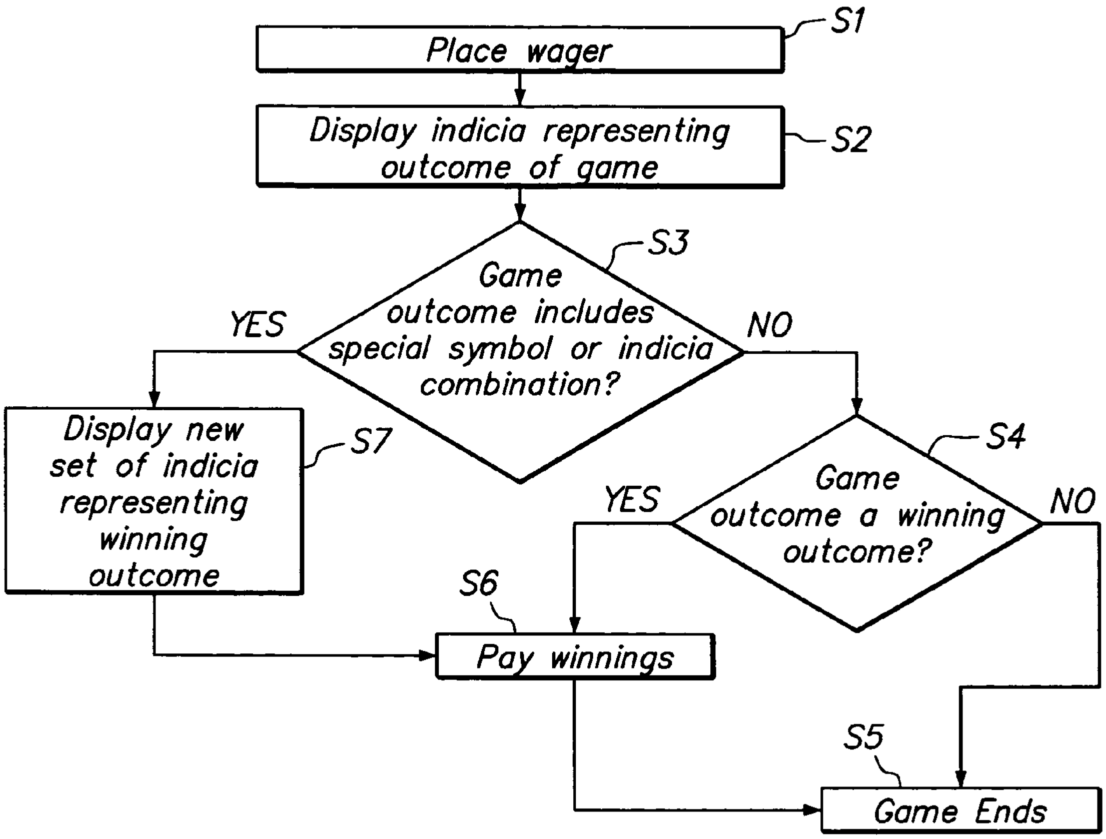
FIG. 2 is a flow diagram of a method of playing a game in accordance with an embodiment of the invention.

One aspect of the invention is a method of playing a game. One embodiment of such a method will be described with reference to FIG. 2.

Preferably, the game is played as a wager-type game. In such a game, in a first step S1, a play places a wager. The wager preferably represents value, such as monies or credits representing monies. As indicated above, the player may place a wager in a variety of ways. For example, the player may provide coins or currency to the gaming machine, or information representative of such value may be provided using a credit, debit or smart card, or using a printed coupon or receipt. As is known, the value of monies provided by the player to the gaming machine is generally represented by credits. The player wagers one or more of those credits.

Of course, the method of placing a wager may vary depending upon the environment. For example, if the game were played as a table-type game, the player might place a wager with a chip representing value.

The game is played by displaying one or more indicia or symbols, as in a step S2. The symbols or indicia may represent the outcome or play of a variety of games. For example, in one embodiment, the game which is played is a video slot game in which a plurality of indicia are displayed in rows and columns. Such games are well known. The game may also be a game of video poker, keno, bingo, pull-tab, lottery or the like. When the game is played on a mechanical or electromechanical device, the indicia or symbols may be displayed by spinning the reels or the like.

The game may permit input by a player and/or involve one or more steps of play to achieve an outcome. For example, in the game of video poker, a first set of card indicia are displayed. The player may then be permitted to discard one or more or all of the cards represented by those indicia and draw new cards represented by new indicia. The outcome of the game is then represented by the resulting card indicia after the discard and draw steps.

In the case of a keno-type game, indicia such as the numbers 1-80 are displayed. The player selects some of those numbers. A set of house numbers are drawn and it is determine whether any of those house numbers match the numbers the player selected.

In the game of bingo, a bingo card bearing numbers is displayed. Numbers, such as those marked on bingo balls, are drawn. Matches to the numbers on the player's bingo card are indicated (automatically or by the player daubing the card).

As indicated, these games may be played on a gaming machine, such as a slot machine or video gaming machine. The games may also be played at gaming tables or using other equipment, such as pull-tabs, lottery cards or the like.

In a step S3, it is determined if the outcome of the game includes one or more special symbols or indicia, or a particular combination of symbols or indicia. Preferably, this step occurs at the conclusion of a first phase of the game. For example, in the game of slots, this may occur after all indicia have been displayed. In the game of video poker, this may occur when the player's hand has been finalized. In the games of keno and/or bingo, it may occur after the player's card has been marked/matches have been determined.

In accordance with one embodiment of a game, it is determined if the player received a particular symbol or indicia. In one embodiment, that symbol may be any of the symbols or indicia which are displayed. In another embodiment, the symbol must appear in a particular position. For example, in the game of slots, the symbol may be required to appear along an active payline.

In one embodiment, play of the game of the invention comprises play of a game with one or more special symbols. These special symbols are symbols which are different from those which are ordinarily used to play the particular game. For example, in the game of video poker, the symbol may comprise a symbol other than one of the fifty-two cards of a deck of cards, such as a special card or a symbol other than a card. In the game of slots, the symbol may comprise a special symbol other than the symbols or indicia which the player attempts to match for winning combinations.

In another embodiment, the step comprises determining if a particular combination of symbols or indicia are received. That combination may comprise a combination of special or unique symbols, or may comprise one or more combinations of the symbols used to play the main game. For example, the special combination of indicia could comprise a Royal Flush when playing the game of video poker or a particular bingo card pattern when playing bingo.

In accordance with the invention, in a step S4, if the outcome does not include the special symbol or indicia or combination of symbols or indicia, then it is determined if the game result is otherwise a winning outcome. This step may comprise, for example, comparing the set of indicia to predetermined winning combinations of indicia. For example, in the game of slots, this step may comprise determining if a winning combination of indicia are located along any active payline. In the game of video poker, this may comprise determining if the player's hand includes any winning hand of cards. In the game of keno, this may comprise determining if the player received a sufficient number of matches. In the game of bingo, this may comprise determining if the player received a winning pattern of matching number/symbols.

If the player did not receive a winning result or outcome, then in a step S5, the game preferably ends. In that event, the player preferably loses their wager and is paid no winnings.

If the player does receive a winning result or outcome, then in a step S6, a winning result is declared and the player is preferably paid winnings. The winnings may comprise credits, coins, currency, a receipt or coupon evidencing the winning, or other prizes or awards.

Most preferably, in accordance with one embodiment of the invention, if the player receives a special symbol or indicia or combination thereof in step S3, then a secondary event is initiated.

In a preferred embodiment of the game, if the player receives the symbols or indicia designated in step S3, then the player is awarded a guaranteed winning outcome. However, because the result is a special result and not one of the predetermined winning outcomes, the player preferably does not know what the winning result is at the time the special symbol(s) are received.

In a preferred embodiment, upon such occurrence, a new set of indicia is displayed to the player, as in step S7. That set of indicia comprises a winning set of indicia associated with a winning result. For example, in the game of video poker, a new set of indicia comprising cards forming a flush may be displayed to the player.

The display of these indicia may be referred to as the display of the winning outcome or result of the special or guaranteed win. As indicated, the indicia which are displayed may vary. In a preferred embodiment, however, the set of indicia which are displayed comprise one of the predetermined winning combinations of symbols for the main game (i.e. those symbols or indicia which would be declared as winning in step S4).

As indicated, in this step, a winning result is displayed. As such, in a step S6, the player is preferably paid winnings or an award as a result of this outcome. As indicated above, such winnings may be paid in variety of forms and manners.

One example of the game of the invention will be described with reference to FIGS. 3(*a*)-(*c*). In this embodiment, the game which is played in accordance with the method of the invention is a game of slots. The game may be presented using an electromechanical "reel" type machine or a video type machine.

After the player has placed a wager, if any is required, then a plurality of indicia are displayed. Referring to FIG. 3(*a*), a set of nine (9) indicia are displayed. In one embodiment, the indicia which are displayed are selected from a group of indicia. That group of indicia may comprise common indicia, such as "7,""Cherry," "Bar," "Diamond" and "blank." The group of indicia may also include at least one special symbol, in this case the "$" symbol. In this embodiment, normal winning combinations can only be formed with the main or common indicia. If the special symbol appears, then the result is an automatic winning outcome which is then represented by a second set of indicia or secondary event.

Figure 3A:
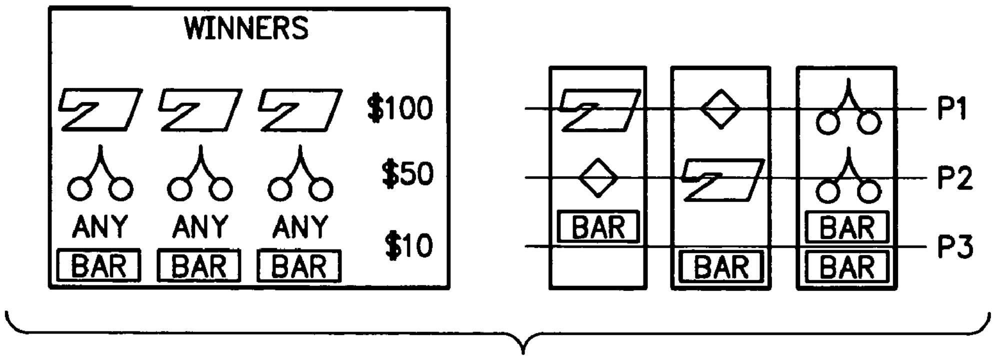
FIG. 3(*a*) illustrates a first set of indicia displayed as part of the play of a main game of the method of the invention.
Figure 3B:
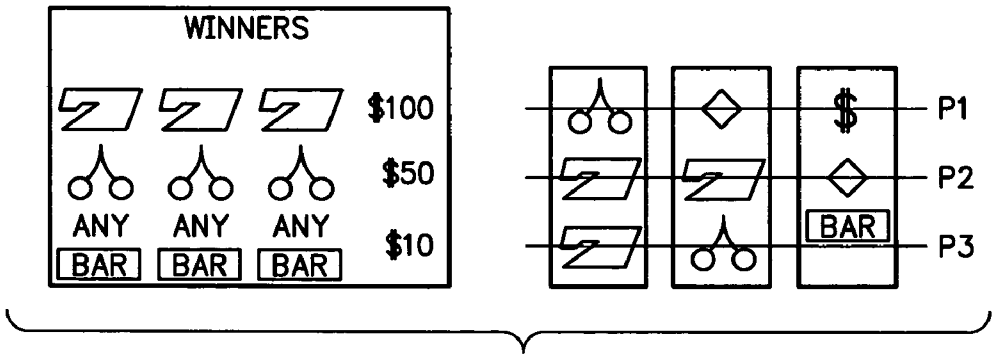
Figure 3C:
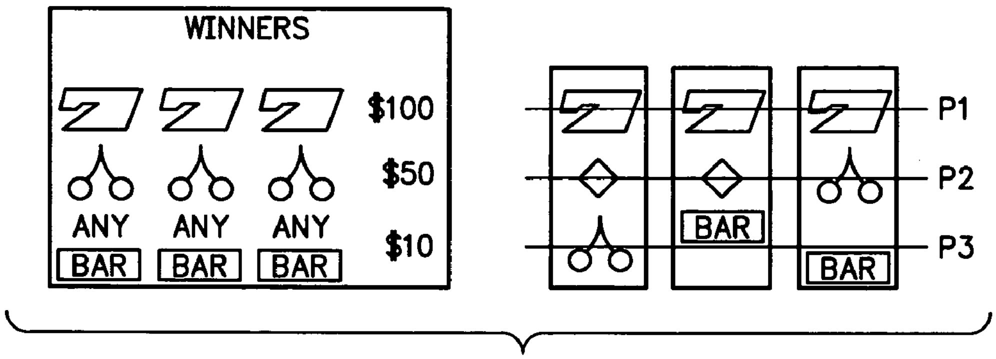

As illustrated in FIG. 3(*a*), the main game is played and a set of indicia are displayed. As illustrated, the special symbol did not appear. As such, it is then determined if the set of indicia which are displayed are a predetermined winning combination. In the embodiment illustrated, sets of indicia along predefined paylines P1, P2 and P3 are compared to predetermined winning combinations. In this case, the combination of "Bar" symbols along payline P3 is indicated to be a winning combination paying $10. As such, the player is awarded winnings and the game ends.

Of course, as is known in the art, the determination of a winning result may depend on the location of the indicia, including whether the indicia are located along an active payline. As is known in the art, paylines are often activated in a number based upon the size of the wager, with a greater number of paylines activated based upon a larger bet.

Referring to FIG. 3(*b*), the play of another game has resulted in the display of the special "$" symbol. As a result, the player is a guaranteed winner of the game. At this point, however, the player does not know what this winning result is. As illustrated in FIG. 3(*c*), a new set of indicia are displayed which represent the winning outcome. As illustrated, a set of indicia including the combination "7-7-7" is displayed. This combination is associated with a winning payout of $100.

Another example of the present invention will be described with reference to FIGS. 4(*a*)-(*c*). In this embodiment, the main game which is played is the game of bingo. As illustrated in FIG. 4(*a*), a bingo card is provided or displayed, that card bearing indica such as numbers. FIG. 4(*a*) illustrates one example of a bingo card, it being understood that the card may have other forms, including a central "free" space and other configurations.

As is known, numbers are drawn or "called." If those numbers match, then such is indicated by "daubing." The daubing may be performed by the player or done automatically. FIG. 4(*b*) illustrates the player's card after daubing, wherein the player matched the four numbers at the corners of the card. In one embodiment, a special symbol or symbols may be displayed on the player's card. The special symbol or symbols may be displayed randomly, apart from numbers which are matched. In another embodiment, a special symbol may comprise the "marking symbol."

As illustrated in FIG. 4(*b*), the player has received the special symbol "$." This symbol may have been displayed randomly as part of game play, or have been displayed by reason of the player matching the number "1" on the card.

In accordance with the invention, a new set of indicia or other secondary event representing the automatic or guaranteed win represented by the special symbol are now displayed. In one embodiment, the indicia could comprise a bingo card displaying a set of daubed spaces which represent a winning pattern, such as a card showing all spaces of a single column or row filled in.

As illustrated in FIG. 4(*c*) in an alternate form, the indicia used to represent the guaranteed win may correspond to an entirely different game or manner of display. In this embodiment, the indicia displayed are represented as the outcome of a "slot" type game. In this case, the outcome of the slot game is the winning result or symbol set of 7-7-7. The player is then credited with the appropriate award, paid winnings or the like.

A variety of additional aspects of the game will now be described, it being appreciated that the invention is not limited to the preferred embodiment games just described.

As described above, in one embodiment of the game, a main or base game is played to completion, such as by displaying slot indicia or by completing a game of bingo or keno. It will be appreciated, however, that the special symbol could be displayed or occur at any time during the play of a game. In such event, the mere occurrence of the symbol represents a guaranteed win, and the play of the base game could stop and the indicia corresponding to the win could be displayed.

In one example, the main game may be a game of video poker. The special symbol or symbols could be displayed as part of the first set of cards dealt to the player. In that case, the game could continue directly to the display of the indicia corresponding to the winning result, rather than continuing on with the base game where the player selects cards to hold and then redraw.

In one embodiment, the display of the special symbol or symbols corresponds to a particular winning result. For example, in the game of slots, when the special symbol is displayed that symbol corresponds to a particular winning result which is represented by a set of indicia. For example, at the time the special symbol is displayed, that display may correspond to the winning result 7-7-7. Of course, this is not known to the player, but is a result of the generation of the game indicia as part of a random game play game generator of the gaming machine/server.

In another embodiment, the special symbol or symbols do not correspond to a particular guaranteed winning result. In that embodiment, the particular guaranteed winning result may be randomly selected from all potential winning results. For example, in the embodiment illustrated in FIG. 3(*a*), the winning result may be randomly selected from the group of winning results comprising 7-7-7, cherry-cherry-cherry or bar-bar-bar.

As described, in a preferred embodiment, if the special symbol or symbols are received, the play of the main game ends and the game proceeds to the display of the automatic or guaranteed win. In other words, any additional play of the main game stops and it is not determined whether the outcome of the main game is otherwise a winning result.

In another embodiment, regardless of whether the special symbol or symbols are received, play of the main game continues and/or it is determined if the play of the main game is a winning result. For example, in the embodiment illustrated in FIG. 4(*b*), it may be determined if the set of daubed positions (i.e. the "four corners") comprises a winning pattern. If so, the player may be also paid winnings for that result.

The play of the main game may continue immediately or may resume after the guaranteed result is displayed. For example, in the game of video poker, if the special symbol or symbols is received as part of the main card draw, then the guaranteed win set of symbols may be displayed. The main set of cards may then be re-displayed and the player may select cards to hold/draw and the main game may continue.

In one embodiment, the indicia which are displayed as part of the main game and the guaranteed win (if such occurs) may be displayed in the same area or in different areas. For example, the gaming machine could include a set of mechanical reels for play of the main game, and a secondary video display for displaying the set of winning indicia for guaranteed wins. The gaming machine may also display those indicia in different areas of the same display. Alternatively, the indicia may be displayed sequentially in the same area.

The game of the invention has numerous advantages. The game has the potential for substantial excitement, with the player knowing that every time the game is played they have the opportunity to receive the special symbol or symbols and obtain a guaranteed win. Moreover, the player has the opportunity to win even if they do not receive the special symbol or symbols.

Additional excitement arises because when the player receives the special symbol or symbols, they do not know what win they have received. Instead, they get to "play" a winning round or secondary event where winning indicia are displayed, but the outcome of that display is not known. Thus, there is substantial anticipation for the player awaiting the results of their guaranteed win.

As indicated above, the invention may has applicability to games other than those presented on gaming devices. For example, if a player receives a special symbol or combination of symbols or other indicia while playing a table game such as poker, or a game of pull-tabs or lottery type game, then a second set of indicia may be provided to the player. For example, in a table game, if a player receives a card with a special symbol or receives a certain hand, the player might be presented with a winning pull-tab ticket or other means may be provided for displaying the winning outcome.

As another aspect of the invention, the outcome of the game may not be a guaranteed winning outcome when the special symbol or combination of indicia are received. Instead, the result maybe a winning or non-winning result. For example, when the special symbol is received, an outcome may be randomly selected from a group of winning and non-winning results and that selected outcome may be displayed.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A method of playing a game comprising the steps of: accepting a wager from a player;

playing a game by displaying a first set of indicia to a player; and determining if said first set of indicia comprises a special symbol or combination of indicia and, if so, determining that the outcome of said game is a guaranteed winning outcome, said guaranteed winning outcome having an award value then unknown to said player, said game then further comprising the steps of displaying a second set of indicia to said player, said second set of indicia comprising a predefined winning result having an associated award, and awarding said award to said player for said guaranteed winning outcome.

2. The game in accordance with claim 1 wherein said game is a game of bingo and said first set of indicia comprises a bingo card bearing one or more numbers which may be matched to one or more house symbols.

3. The game in accordance with claim 1 wherein said first set of indicia comprises slot symbols.

4. The game in accordance with claim 1 wherein said second set of indicia comprises slot symbols.

5. The game in accordance with claim 4 wherein said first set of indicia comprises bingo symbols arranged in a matrix and said second set of indicia comprises slot symbols arranged in at least one row.

6. The game in accordance with claim 1 wherein said second set of indicia is randomly selected from a plurality of sets of predetermined winning results.

7. The game in accordance with claim 1 wherein if said first set of indicia did not comprise said special symbol or combination of indicia, determining if said first set of indicia otherwise comprised an otherwise predetermined winning combination of indicia and awarding an award to said player if a winning combination is received.

8. A gaming machine configured to present a game comprising:

means for accepting a wager from a player;

means for displaying a first set of indicia to said player as part of the play of a game;

means for determining if said first set of indicia includes or comprises a special symbol or set of symbols comprising a guaranteed winning outcome having an award value then unknown to said player;

means for displaying a second set of indicia to said player if said first set of indicia includes or comprises said special symbol or set of symbols, said second set of indicia comprising a predefined winning result having an associated award; and means for awarding said award to said player.

9. The gaming machine in accordance with claim 8 wherein said means for displaying said first set of indicia comprises a set of slot reels.

10. The gaming machine in accordance with claim 9 wherein said means for displaying said second set of indicia comprises said set of slot reels.

11. The gaming machine in accordance with claim 8 wherein said means for displaying said first set of indica comprises a video display.

12. The gaming machine in accordance with claim 8 further comprising means for determining if said first set of indicia do not include or comprise said special symbol or set of symbols and, if so, determining if said first set of indicia otherwise comprises a winning outcome.

* * * * *